United States Patent
Yamada

(10) Patent No.: US 7,428,112 B2
(45) Date of Patent: Sep. 23, 2008

(54) OBJECTIVE LENS DRIVING DEVICE HAVING DAMPER PORTIONS CAPABLE OF OBTAINING A MODERATE DAMPING EFFECT

(75) Inventor: Tsukasa Yamada, Tokyo (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 70 days.

(21) Appl. No.: 10/998,244

(22) Filed: Nov. 24, 2004

(65) Prior Publication Data
US 2005/0134974 A1 Jun. 23, 2005

(30) Foreign Application Priority Data
Dec. 19, 2003 (JP) ............................. 2003-423278
Apr. 26, 2004 (JP) ............................. 2004-129152

(51) Int. Cl.
G02B 7/02 (2006.01)
(52) U.S. Cl. ..................... 359/813; 359/809; 359/815
(58) Field of Classification Search .................. 359/813
See application file for complete search history.

(56) References Cited

U.S. PATENT DOCUMENTS

| | | | |
|---|---|---|---|
| 5,604,641 A | | 2/1997 | Matsui |
| 5,734,638 A * | | 3/1998 | Matsui ......................... 720/684 |
| 6,091,553 A | | 7/2000 | Song et al. |
| 6,160,771 A * | | 12/2000 | Kawano et al. .......... 369/44.15 |
| 6,163,416 A | | 12/2000 | Uekusa et al. |
| 6,285,517 B1 * | | 9/2001 | Uekusa et al. ............... 359/813 |
| 6,704,255 B2 * | | 3/2004 | Tanaka ..................... 369/44.14 |
| 6,801,483 B2 * | | 10/2004 | Hong et al. ............... 369/44.15 |
| 2003/0142616 A1 * | | 7/2003 | Hori ........................... 369/244 |
| 2003/0161252 A1 | | 8/2003 | Sugawara |

FOREIGN PATENT DOCUMENTS

| | | |
|---|---|---|
| EP | 0 997 889 A1 | 5/2000 |
| JP | 09-185830 | 7/1997 |
| JP | 11-285516 | 9/1999 |
| JP | 2001-93177 A | 4/2001 |
| JP | 2002-133677 | 5/2002 |
| JP | 2003-151157 A | 5/2003 |

OTHER PUBLICATIONS

English machine translation of JP 11-265516.*

* cited by examiner

Primary Examiner—Jessica T Stultz
(74) Attorney, Agent, or Firm—Frishauf, Holtz, Goodman & Chick, P.C.

(57) ABSTRACT

In an objective lens driving device having a lens holder movably holding an objective lens, a damper base, and a suspension member elastically supporting the lens holder with respect to the damper base, the suspension member consists of four suspension wires disposed on both sides of the damper base and the lens holder. The damper base has first supporting portions for supporting one end of each suspension wire while the lens holder has second supporting portions for supporting another end of each suspension wire. The second supporting portions are apart from the first supporting portion by a first distance. The damper base has damper portions which are disposed between the first and the second supporting portions and which are apart from the first supporting portions by a second distance. The second distance is laid in a range between one-fifths and two-fifths of the first distance.

18 Claims, 11 Drawing Sheets

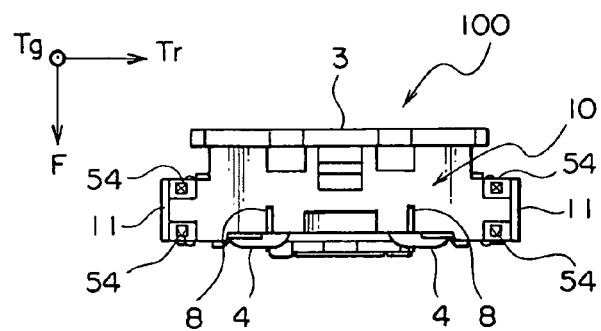
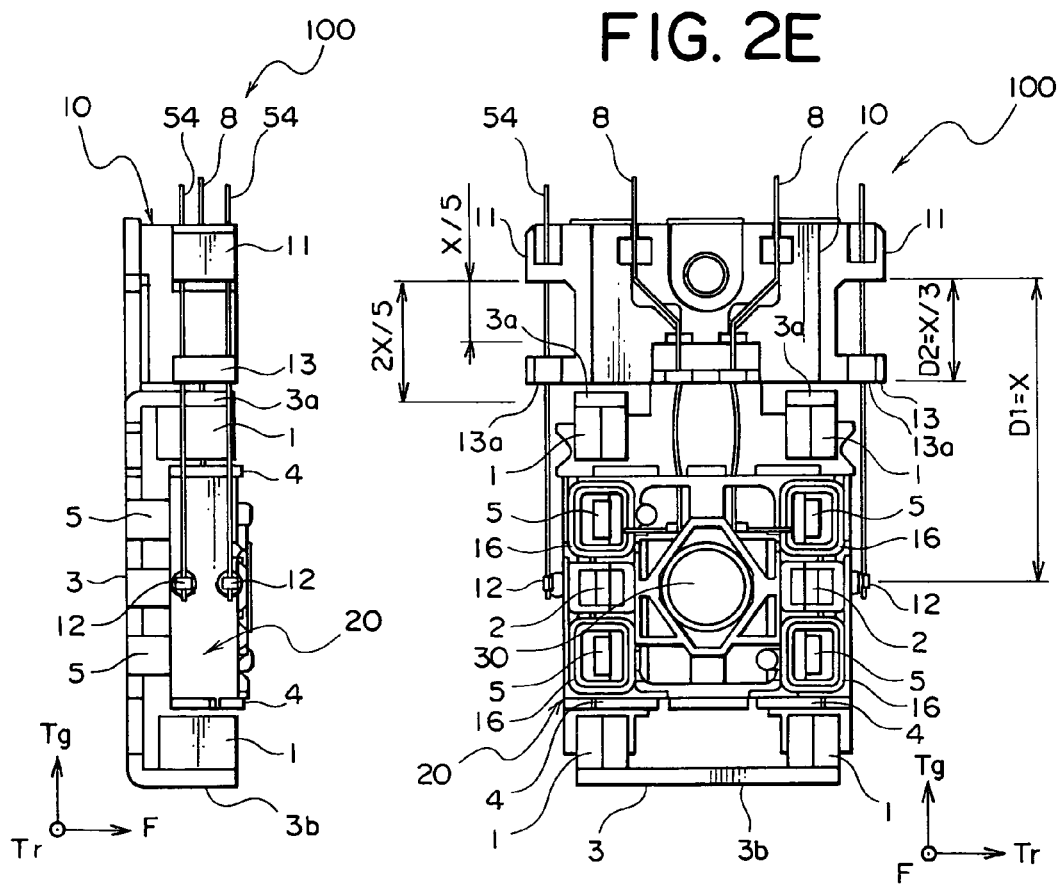
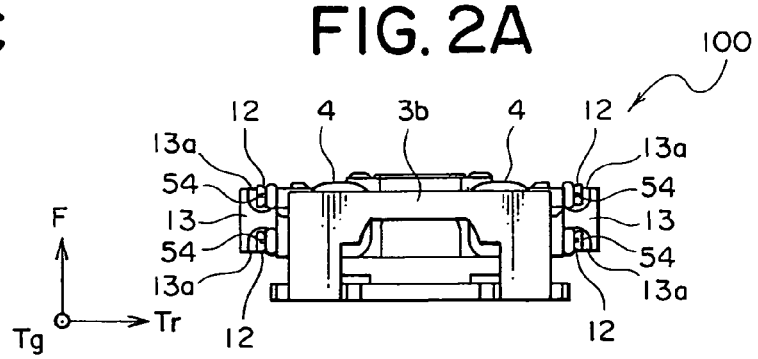
FIG. 2E
FIG. 2C    FIG. 2A
FIG. 2B

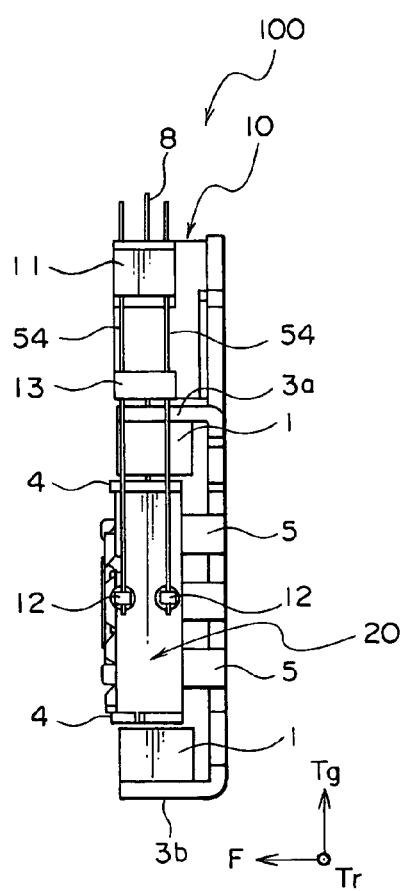
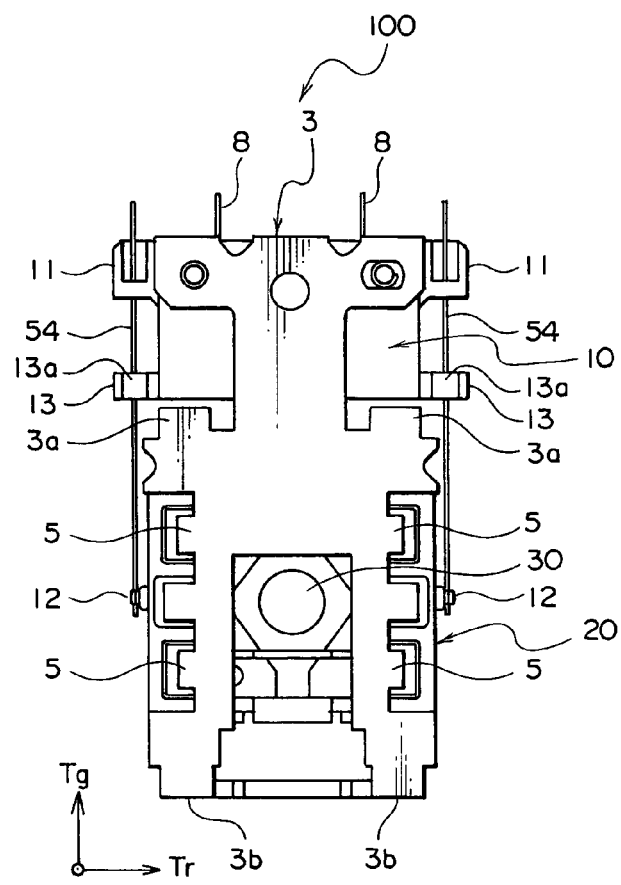
FIG. 2D
FIG. 2F

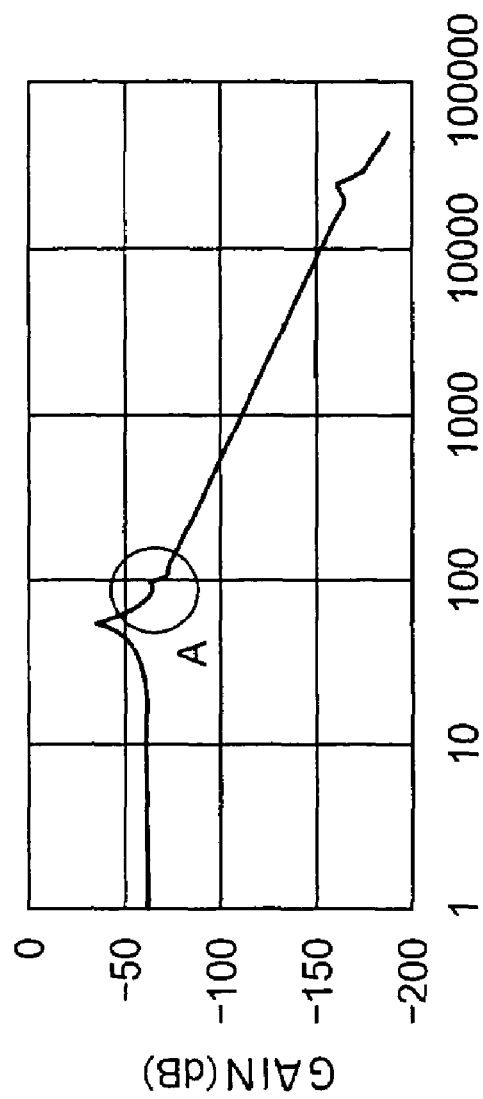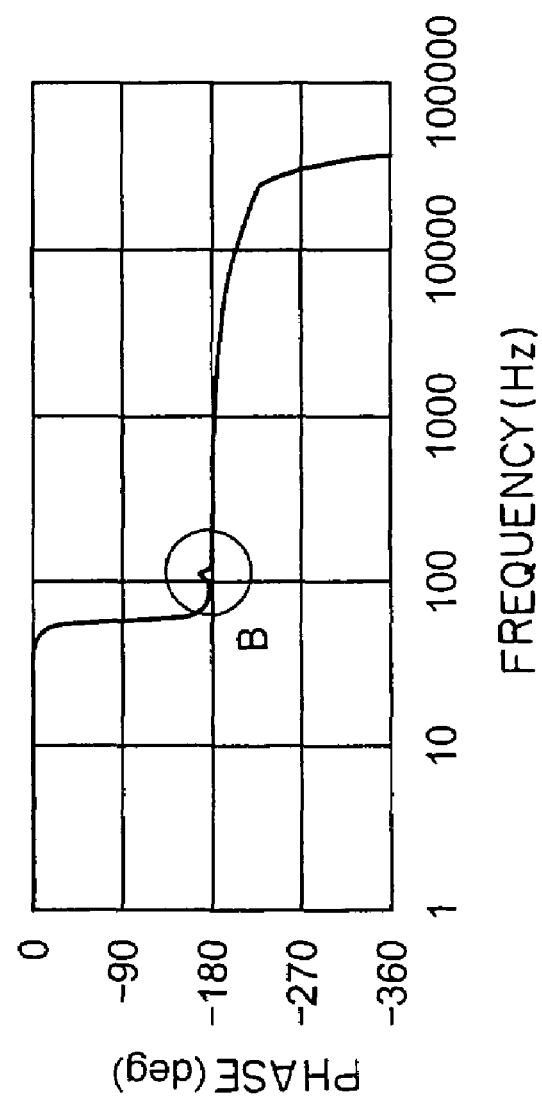
FIG. 6A
PRIOR ART
FIG. 6B
PRIOR ART

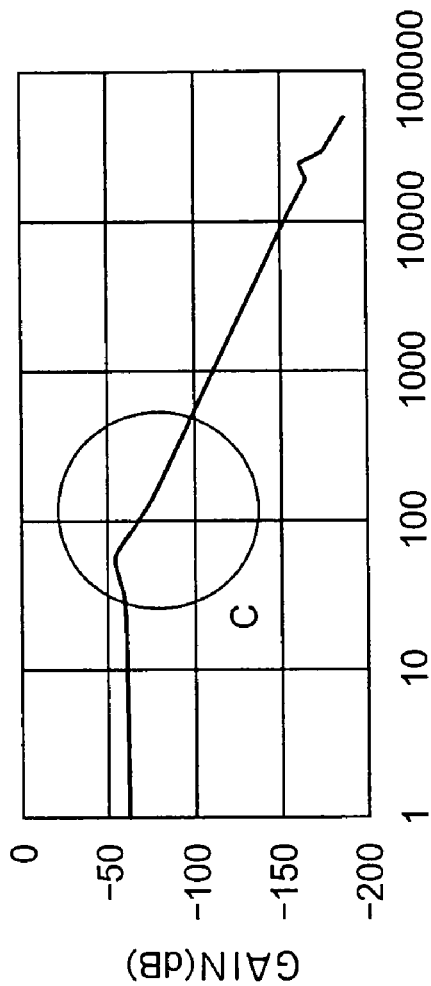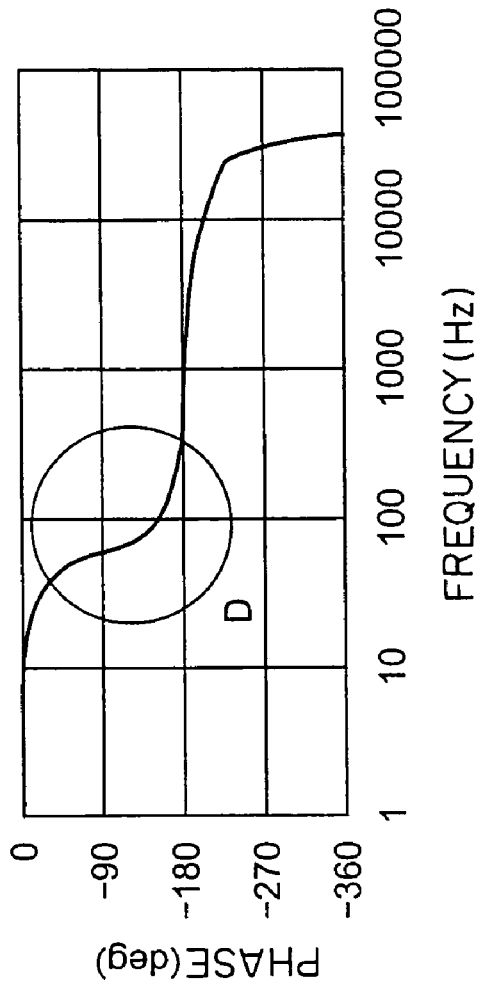
FIG. 7A
PRIOR ART
FIG. 7B
PRIOR ART

OBJECTIVE LENS DRIVING DEVICE HAVING DAMPER PORTIONS CAPABLE OF OBTAINING A MODERATE DAMPING EFFECT

This application claims priority to prior Japanese patent applications JP 2003-423278 and 129152/2004, the disclosures of which are incorporated herein by reference.

BACKGROUND OF THE INVENTION

This invention relates to an objective lens driving device suitable for use in an optical pickup of an optical disc drive or the like, and further relates to an optical pickup using it.

An optical disc drive is a device for reading or writing information from or into an optical disc (CD, CD-ROM, CD-R, CD-RW, DVD-ROM, DVD+R, DVD-R, DVD-RAM, DVD+RW, DVD-RW, Blu-ray, AOD, or the like). In order to achieve reading or writing the information from or into the optical disc, the optical disc drive of this type comprises an optical pickup for irradiating a laser beam onto the optical disc and detecting its reflected light.

In general, an optical pickup comprises a laser beam source for emitting a laser beam and an optical system for guiding the emitted laser beam to an optical disc and further guiding its reflected light to a photodetector. This optical system includes an objective lens disposed so as to confront the optical disc.

It is necessary that the objective lens used in the optical pickup be accurately controlled in position with respect to a focus direction along an optical axis and a track direction along a radial direction of the optical disc to thereby accurately focus a laser beam on a track of a recording surface of the rotating optical disc. These controls are called a focusing control and a tracking control, respectively. Further, following improvement in recoding density, there have recently been increasing demands for removing or suppressing the influence caused by warping of the optical disc. In view of this, it is also necessary that the objective lens be subjected to a so-called tilting control.

In an objective lens driving device of this type, a lens holder holding the objective lens is elastically supported by a plurality of suspension wires for enabling the focusing control, the tracking control, and the tilting control. Further, focusing coils, tracking coils, and tilting coils are attached to the lens holder. These coils are partly located in gaps of a magnetic circuit. With this structure, the conventional objective lens driving device is capable of finely controlling a position and an inclination of the objective lens by controlling currents flowing through the respective coils.

Recently, there has been available a super thin type optical disc drive called an ultra slim drive. In the super thin type optical disc drive of this type, an objective lens driving device is normally configured as a so-called asymmetry type. With this asymmetry type objective lens driving device, acceleration sensitivity can be enhanced, but it is quite difficult to prevent occurrence of undesired resonance such as rolling, pitching, or yawing of an objective lens.

On the other hand, it has also been proposed to configure an objective lens driving device as a so-called symmetry type (see, e.g. JP 2001-93177 A). With this symmetry type objective lens driving device, it is easy to prevent occurrence of undesired resonance of an objective lens.

In addition, an optical pickup actuator of which manufacturing cost is reduced by decreasing the quantity of used damper material has been proposed (see, e.g. JP 2003-151157 A). According to JP 2003-151157 A, the optical pickup actuator comprises a movable part with an objective lens and a fixed part with a holding part connected to the movable part with at least two suspension wires. The movable part is relatively moved with respect to the fixed part by means of magnetic driving means. The holding part is provided with grooves which are provided on the opposing face sides and through which respective suspension wires are inserted, and a damper material furnished in the grooves. However, JP 2003-151157 A neither discloses nor teaches an optimal damper material applied position in order to obtain a moderate damping effect.

SUMMARY OF THE INVENTION

It is therefore an object of the present invention to provide an objective lens driving device which is capable of obtaining a moderate damping effect.

Other objects of this invention will become clear as the description proceeds.

According to an aspect of this invention, an objective lens driving device comprises a lens holder movably holding an objective lens, a damper base, and a suspension member elastically supporting the lens holder with respect to the damper base. The suspension member comprises a plurality of suspension wires disposed on both sides of the damper base and the lens holder. The damper base has first supporting portions for supporting one end of each of the suspension wires. The lens holder has second supporting portions for supporting another end of each of the suspension wires. The second supporting portions are apart from the first supporting portions by a first distance. The damper base further has damper portions disposed between the first supporting portions and the second supporting portions. Each of the damper portions has grooves filled with damper material through with respective suspension wires are inserted. The damper portions are apart from the first supporting portions by a second distance. The second distance is laid in a range between one-fifths and two-fifths of the first distance.

BRIEF DESCRIPTION OF THE DRAWINGS

FIG. 2A is a plan view of the objective lens driving device illustrated in FIG. 1;

FIG. 2B is a front view of the objective lens driving device illustrated in FIG. 1;

FIG. 2C is a left-hand view of the objective lens driving device illustrated in FIG. 1;

FIG. 2D is a right-hand side view of the objective lens driving device illustrated in FIG. 1;

FIG. 2E is a rear view of the objective lens driving device illustrated in FIG. 1;

FIG. 2F is a bottom view of the objective lens driving device illustrated in FIG. 1;

FIGS. 6A and 6B show a Bode diagram of the objective lens driving device when a damper material applied position is equal to one-tenths of a distance between fixing ends;

FIGS. 7A and 7B show a Bode diagram of the objective lens driving device when the damper material applied position is equal to a half of the distance between the fixing ends;

DESCRIPTION OF THE PREFERRED EMBODIMENT

Figure 1:
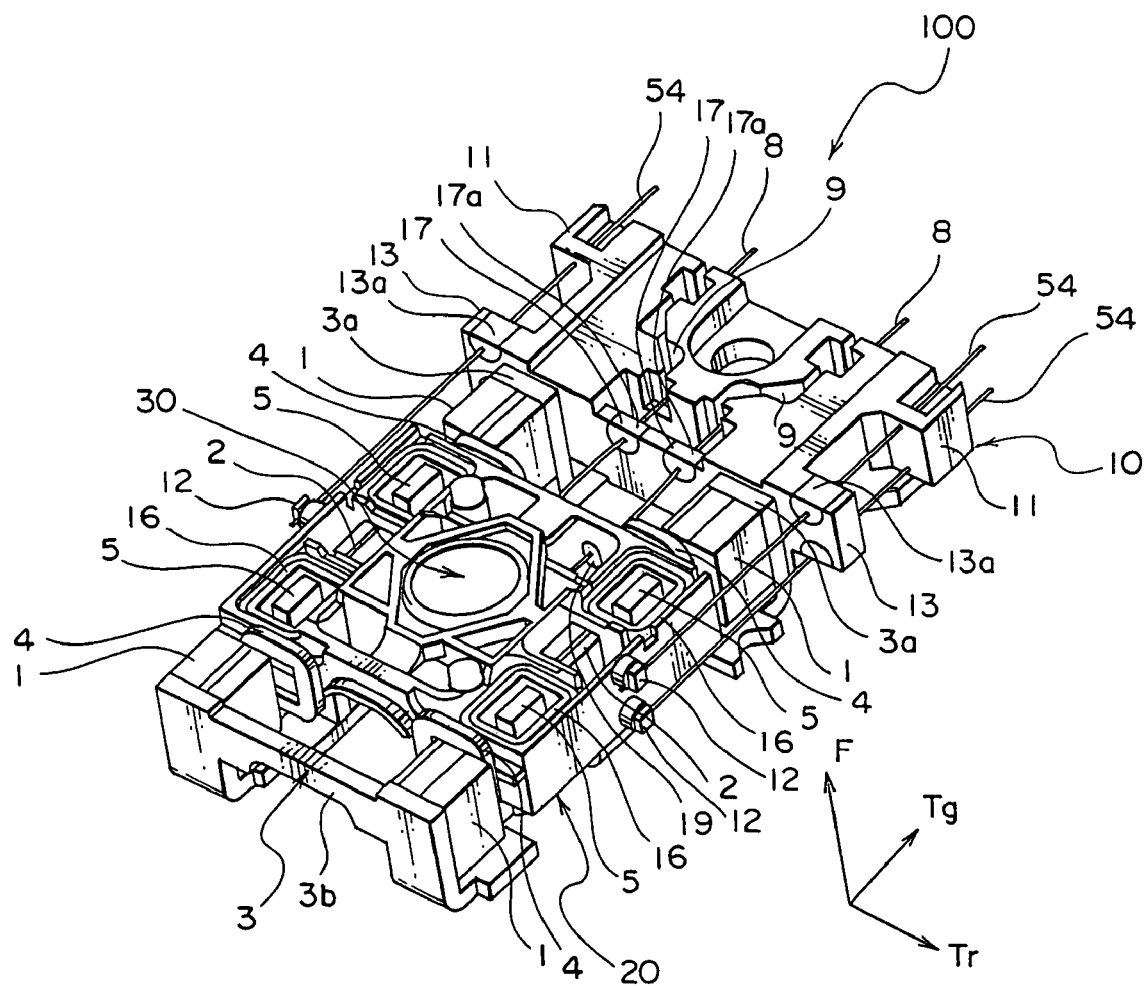
FIG. 1 is a perspective view of an objective lens driving device according to a first embodiment of this invention.

Referring to FIG. 1 and FIGS. 2A, 2B, 2C, 2D, 2E, and 2F, description will proceed to the overall structure of an objective lens driving device 100 according to a first embodiment of the present invention. FIG. 1 is a perspective view of the objective lens driving device 100. FIG. 2A is a plan view of the objective lens driving device 100. FIG. 2B is a front view of the objective lens driving device 100. FIG. 2C is a left-hand side view of the objective lens driving device 100. FIG. 2D is a right-hand side view of the objective lens driving device 100. FIG. 2E is a rear view of the objective lens driving device 100. FIG. 2F is a bottom view of the objective lens driving device 100.

The illustrated objective lens driving device 100 comprises a damper base 10, a lens holder 20, an objective lens 30 retained by the lens holder 20, four suspension wires 54 swingably supporting the lens holder 20 relative to the damper base 10, two lead wires 8, a yoke base 3 fixed to the damper base 10, and four main or first permanent magnets 1 and two auxiliary or second permanent magnets 2 fixed to the yoke base 3.

The objective lens driving device 100 is mounted on an optical base (not shown) of an optical disc drive and forms part of an optical pickup. The optical base is attached to guide bars (not shown) so as to movable in a radial direction of an optical disc (i.e. a tracking direction Tr) loaded into the optical disc drive. The objective lens 30 has an optical axis extending in a focusing direction F perpendicular to the optical disc loaded in the optical disc drive.

The optical base is further mounted with a laser diode, a photodetector, and a predetermined optical system. A laser beam from the laser diode is irradiated onto the optical disc via the optical system, and its reflected light is guided to the photodetector via the optical system. In this case, the objective lens 30 is included in the optical system.

On both lateral sides, with respect to a tangential direction Tg, of the damper base 10, damper portions 13 and first supporting portions 11 are respectively formed for damping and supporting the suspension wires 54. Specifically, the first supporting portions 11 elastically support one end of each suspension wire 54 via adhesive agents (not shown). The damper portions 13 are apart from the first supporting portions 11 in the tangential direction Tg towards to the lens holder 20. Each of the damper portions 13 has U-shaped grooves on opposing ends in the focusing direction F that are filled with damper material 13a made of silicone gel or the like through which respective suspension wires 54 are inserted.

Further, at a center portion, in the tracking direction Tr, of the damper base 10, fixing portions 17 are formed at a front end thereof on both sides with respect to the center of the front end of the center portion. In addition, fixing grooves 9 are formed in one-to-one correspondence with the fixing portions 17. The fixing grooves 9 are each formed into an S-shape so as to be more spaced apart from each other as approaching a rear end, in the tangential direction Tg, of the damper base 10. Each fixing groove 9 extends in the tangential direction Tg to open to the outside at the rear end of the damper base 10. The lead wires 8 are elastically supported by the fixing portions 17 via damper material 17a made of silicone gel or the like, respectively.

With the structure as described above, the lens holder 20 is elastically supported by the suspension wires 54 so as to be freely movable within a small range in various directions above the yoke base 3. That is, the lens holder 20 is substantially separated, in terms of vibration, from the damper base 10 and the yoke base 3.

Figure 3:
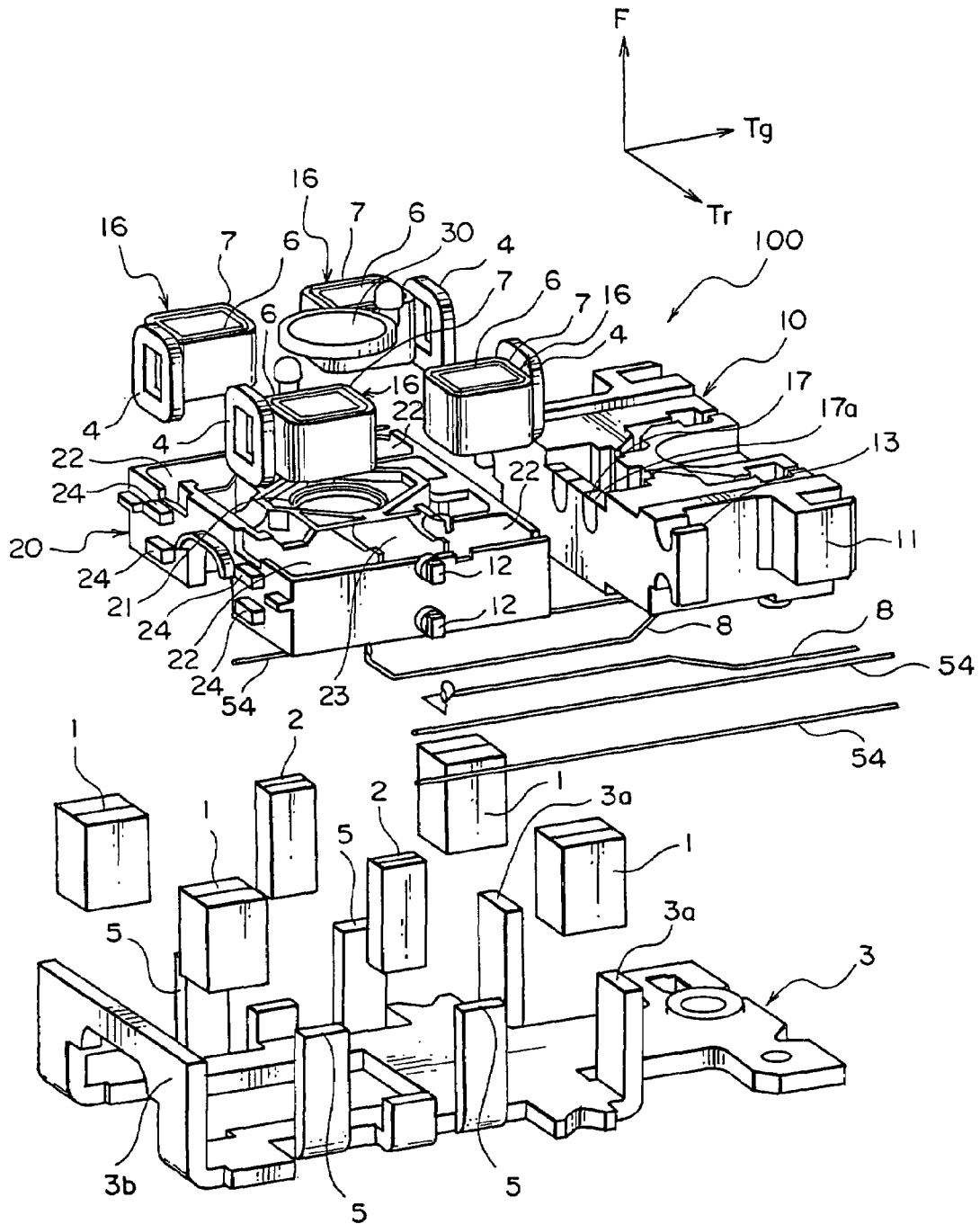
FIG. 3 is an exploded perspective view, as seen obliquely from above, of the objective lens driving device illustrated in FIG. 1.
Figure 4:
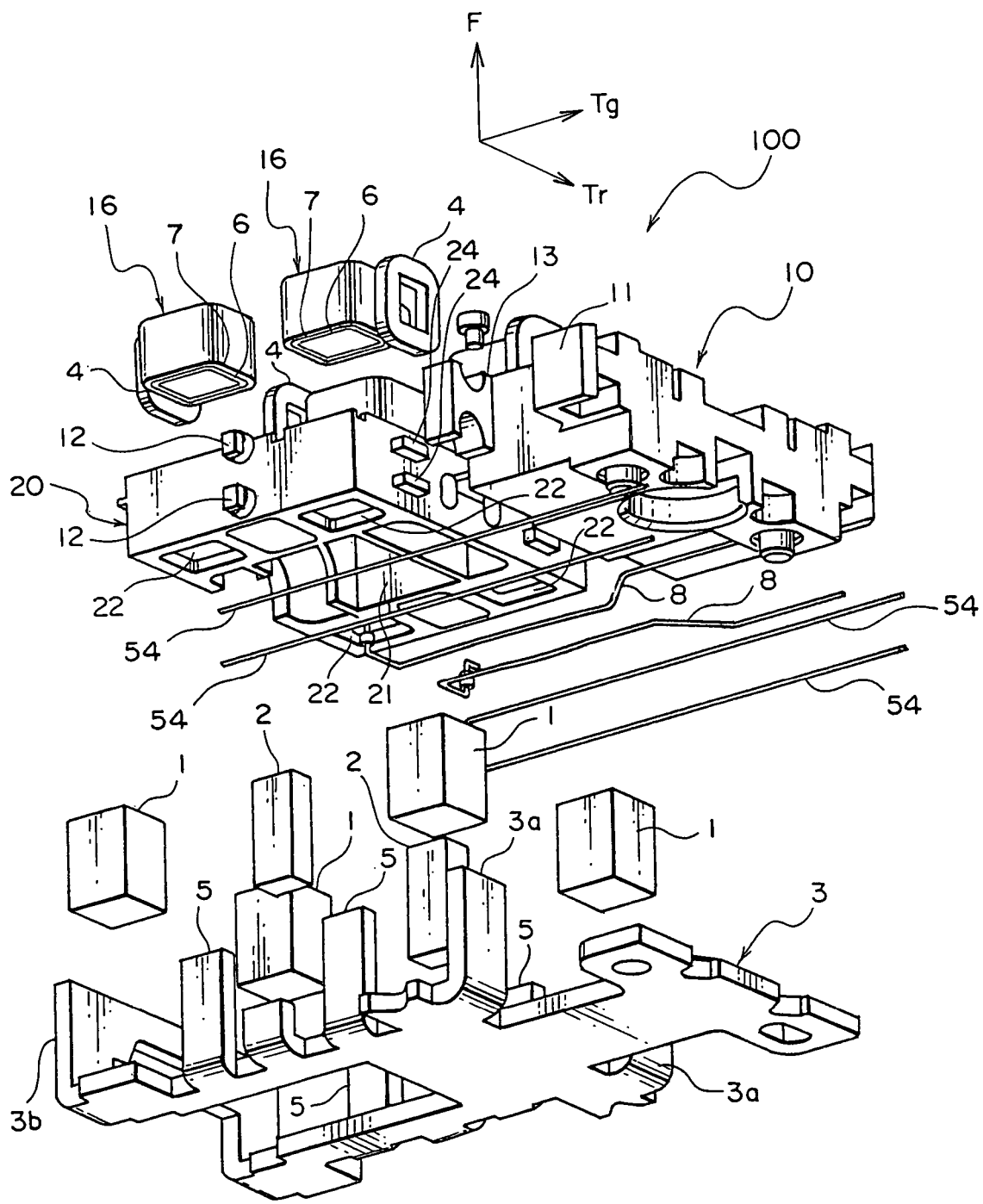
FIG. 4 is an exploded perspective view, as seen obliquely from below, of the objective lens driving device illustrated in FIG. 1.

Referring to FIGS. 3 and 4 along with FIG. 1, description will proceed to a detailed structure of the objective lens driving device 100.

The lens holder 20 is in the shape of a rectangular thick plate and has a mounting hole 21 formed at its center for mounting the objective lens 30 therein, coil mounting holes 22 formed symmetrically at its four corners for mounting coil members 16 therein, respectively, and holes 23 formed for the second permanent magnet 2 to extend therethrough, respectively. The lens holder 20 further has second supporting portions 12 for supporting another end of each of the suspension wires 54. The second supporting portions 12 are formed at both ends, in the tracking direction Tr, of the lens holder 20 with the two of them arranged vertically at each end. The second supporting portions 12 are apart from the first supporting portions 11 in the tangential direction Tg by a first distance D1 as shown in FIG. 2A. That is, the first distance D1 is equal to a distance X between fixing ends.

On the other hand, the damper portions 13 are disposed between the first supporting portions 11 and the second supporting portions 12 in the tangential direction Tg as shown in FIGS. 1 and 2A. The damper portions 13 are apart from the first supporting portions 11 by a second distance D2 as shown in FIG. 2A. In the example being illustrated, the second distance D2 is equal to one-thirds X/3 of the distance X between fixing ends. The second distance D2 is called a damper material applied position. This is because the damper portions 13 have the damper material 13a applied thereto.

Moreover, the lens holder 20 has four pairs of bobbins (hook portions) 24 at both ends thereof in the tangential direction Tg, with the two pairs thereof projecting in the tangential direction Tg at each end. Each pair of bobbins are arranged vertically for a corresponding tracking coil 4 to be wound therearound.

The yoke base 3 comprises four plate-shaped yokes 5 with the two of them provided at two portions on each of both sides of a center portion, in the tangential direction Tg, of the yoke base 3, two plate-shaped yokes 3a provided at portions near one end, in the tangential direction Tg, of the yoke base 3, and a bridge-shaped yoke 3b provided at the other end thereof in the tangential direction Tg. The plate-shaped yokes 5 are received in and extend through the corresponding coil members 16, respectively.

Figure 5:
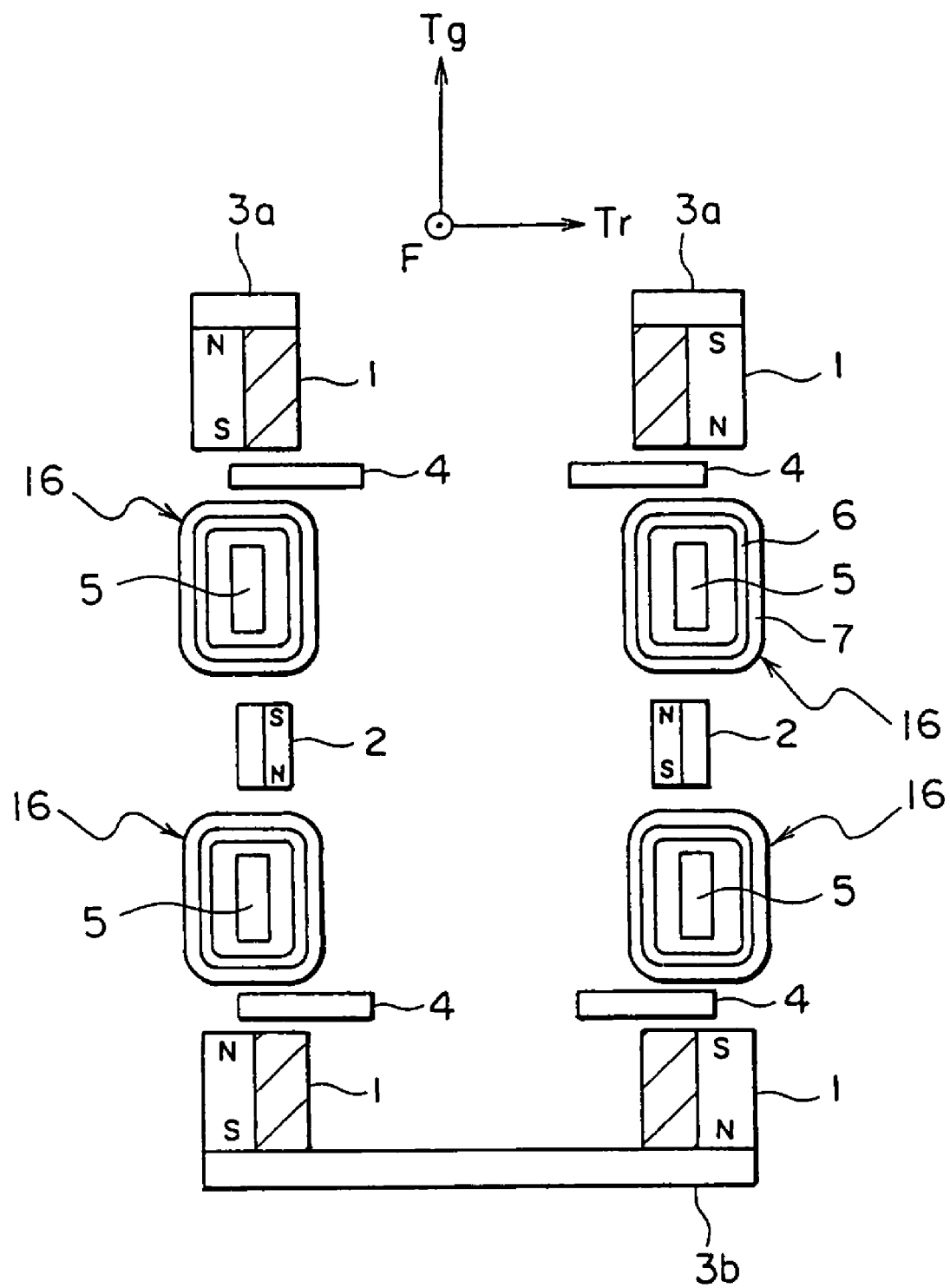
FIG. 5 is an exemplary diagram for describing the main part of the objective lens driving device illustrated in FIG. 1.

Referring further to FIG. 5, description will proceed to arrangement and polarity of the first permanent magnets 1 and the second permanent magnets 2.

The first permanent magnets 1 are disposed in contact with the plate-shaped yokes 3a and 3b, respectively, and have polarities in the tangential direction Tg, respectively. Of the first permanent magnets 1, each pair of the two arranged in the tangential direction Tg and set to have the same polarities while each pair of the two arranged in the tracking direction Tr are set to have the opposite polarities. Each of the second permanent magnets 2 is disposed in the middle between the two first permanent magnets 1 arranged in the tangential direction Tg and has a polarity in the tangential direction Tg which, however, is set opposite to the polarities of those first permanent magnets 1. Therefore, the polarities of the second permanent magnets 2 are set opposite to each other.

Referring back to FIGS. 1 through 4, each of the coil members 16 comprises a tilting coil 6 and a focusing coil 7 wound therearound. Four coil devices each formed by a combination of the coil member 16 and the tracking coil 4 are disposed symmetrically with respect to the lens holder 20. The tilting coil 6 and the focusing coil 7 may be wound around a non-illustrated bobbin or formed as air-core coils. As described above, the tracking coils 4 are wound around the bobbins 24 of the lens holder 20. In this manner, the three kinds of the coils are provided on the lens holder 20. Thereafter, the objective lens 30 is attached to the lens holder 20.

The focusing coils 7 and the tracking coils 4 have end portions respectively connected to the second supporting portions 12, serving as connection terminals, of the lens holder 20. As described above, the suspension wires 54 are also connected at their ends to the second supporting portions 12, respectively.

On the other hand, each tilting coil 6 has one end electrically connected to one end of the lead wires 8 extending with a stepped portion formed on the way to its other end. Specifically, such one end of the tilting coil 6 is drawn out into a space of the lens holder 20 and fixed by soldering to an L-shaped bent end portion formed at the one end of the lead wire 8. In the state where the lead wire 8 passes through the fixing portion 17 and the S-shaped bent fixing groove 9 of the damper base 10 so as to be fixed, the other end of the lead wire 8 projects reward of the damper base 10.

A positional relationship among the tilting coils 6, the focusing coils 7, the tracking coils 4, the main magnets 1, the auxiliary magnets 2, and the yokes 3a, 3b, and 5 can be readily understood from FIG. 5. Specifically, the coil devices are disposed symmetrically at both sides of a plane which includes the optical axis and extends in the tangential direction Tg. The main magnets 1 are also disposed symmetrically at both sides of the plane. Simultaneously, the auxiliary magnets 2 are disposed symmetrically at both sides of the plane. In addition, the tilting coils 6, the focusing coils 7, and the tracking coils 4 are partly disposed in magnetic gaps of a magnetic circuit formed by a combination of the yokes 3a, 3b, and 5, the main magnets 1, and the auxiliary magnets 2.

By properly controlling currents that flow through the coils 6, 7, and 4, the lens holder 20 makes one or more of a tilting motion in the tracking direction Tr (i.e. a turning motion with respect to an axis extending in the tangential direction Tg), a movement in the tracking direction Tr, and a movement in the focusing direction F on the basis of a relationship among magnetic fields produced by the main magnets 1, the auxiliary magnets 2, and the yokes 3a, 3b, and 5. In this event, the main magnets 1 serve to apply driving forces to the focusing coils 7 and the tracking coils 4. The auxiliary magnets 2 serve to supplement driving forces to the focusing coils 7 and the tilting coils 6. Note that the focusing direction F, the tangential direction Tg, and the tracking direction Tr may also be called a first direction, a second direction, and a third direction, respectively.

When the coils 6, 7, and 4 are energized, the focusing coils 7 on both lateral, i.e. right and left, sides with respect to the tangential direction Tg receive driving forces in the same direction with respect to the focusing direction F. Likewise, the tracking coils 4 on both right and left sides with respect to the tangential direction Tg receive driving forces in the same direction with respect to the tracking direction Tr.

On the other hand, the tilting coils 6 on the right and left sides with respect to the tangential direction Tg receive driving forces in mutually opposite directions. In this event, inasmuch as the magnetic force lines are bent by the auxiliary magnets 2 so as to be directed toward the outside and the inside of the yokes in the tracking direction Tr, driving forces in the same direction are applied to the coils on the outside and the inside in the tracking direction Tr to thereby increase electromagnetic forces.

Further, inasmuch as the lead wires 8 are supported on the inside in the tracking direction Tr, the acceleration sensitivity in the tilting direction can be increased and the undesired resonance caused by the tilting coils 6 can be prevented. Likewise, the acceleration sensitivity can also be increased with respect to the focusing coils 7 by the arrangement of the auxiliary magnets 2. Therefore, it is possible to obtain the objective lens driving device that can prevent occurrence of the undesired resonance and achieve the speed-up of the ultra slim drive, i.e. the super thin type optical disc drive.

FIGS. 6A and 6B show a Bode diagram of the objective lens driving device when the second distance (the damper material applied position) D2 is equal to one-tenths X/10 of the distance X between the fixing ends. In FIG. 6A, the abscissa represents a frequency (Hz) in logarithm scale and the ordinate represents a gain (dB). In FIG. 6B, the abscissa represents a frequency (Hz) in logarithm scale and the ordinate represents a phase (deg). With this structure, undesired resonance occurs at a frequency of about 200 Hz as shown at A in FIG. 6A and at B in FIG. 6B. Therefore, this objective lens driving device has no damping effect.

FIGS. 7A and 7B show a Bode diagram of the objective lens driving device when the second distance (the damper material applied position) D2 is equal to a half X/2 of the distance X between the fixing ends. In FIG. 7A, the abscissa represents a frequency (Hz) in logarithm scale and the ordinate represents a gain (dB). In FIG. 7B, the abscissa represents a frequency (Hz) in logarithm scale and the ordinate represents a phase (deg). This objective lens driving device has a strong damping effect. Specifically, undesired resonance does not occurs at the frequency of about 200 Hz by the strong damping effect but it is difficult to carry out servo control due to gain's rounding with respect to the frequency and phase lag thereof as shown at C in FIG. 7A and at D in FIG. 7B, respectively.

Figure 8A:
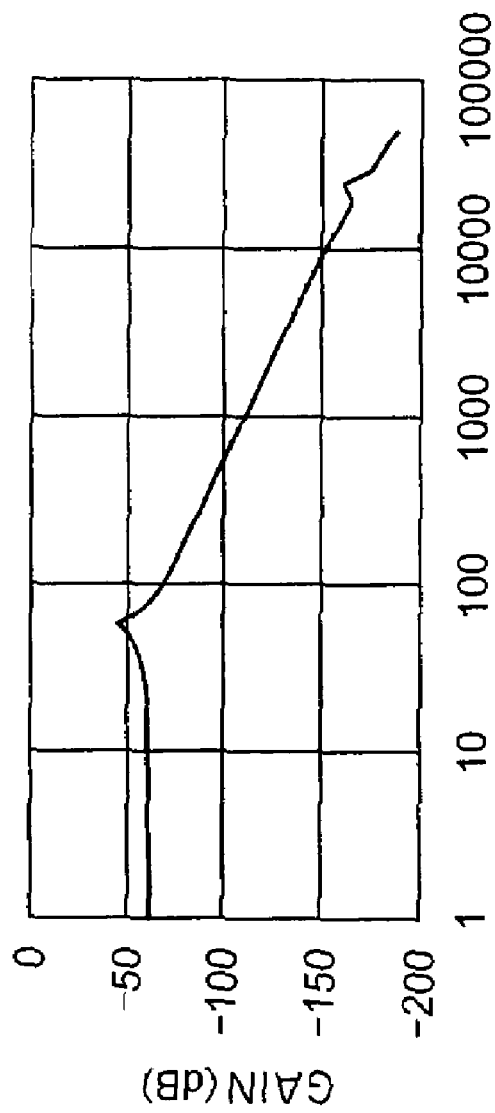
FIGS. 8A and 8B show a Bode diagram of the objective lens driving device when the damper material applied position is equal to one-thirds of the distance between the fixing ends as shown in FIGS. 1 through 5.
Figure 8B:
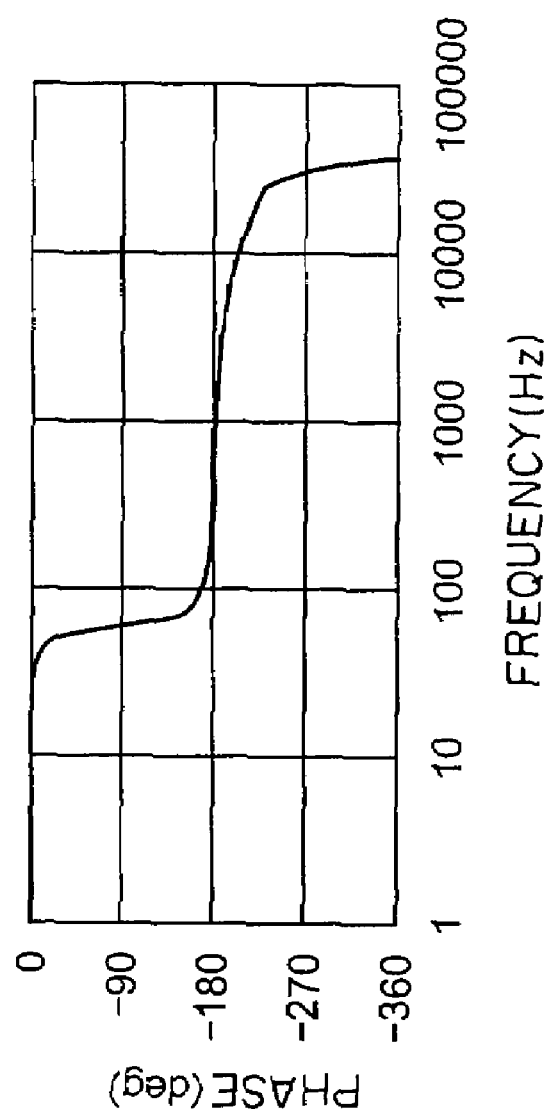

FIGS. 8A and 8B show a Bode diagram of the objective lens driving device when the second distance (the damper material applied position) D2 is equal to one-thirds X/3 of the distance X between the fixing ends as shown in FIGS. 1 through 5. In FIG. 8A, the abscissa represents a frequency (Hz) in logarithm scale and the ordinate represents a gain (dB). In FIG. 8B, the abscissa represents a frequency (Hz) in logarithm scale and the ordinate represents a phase (deg). This objective lens driving device has a moderate damping effect. Specifically, undesired resonance does not occurs at the frequency of about 200 Hz by the moderate damping effect and it is possible to easily carry out servo control without gain's rounding with respect to the frequency.

As a result, it is possible to obtain the best effect when the second distance D2 is laid in a range between one-fifths X/5 and two-fifths 2X/5 of the first distance D1. The range between one-fifths and two-fifths is caused by a difference of the damping effect due to a type of the damping material.

Figure 9:
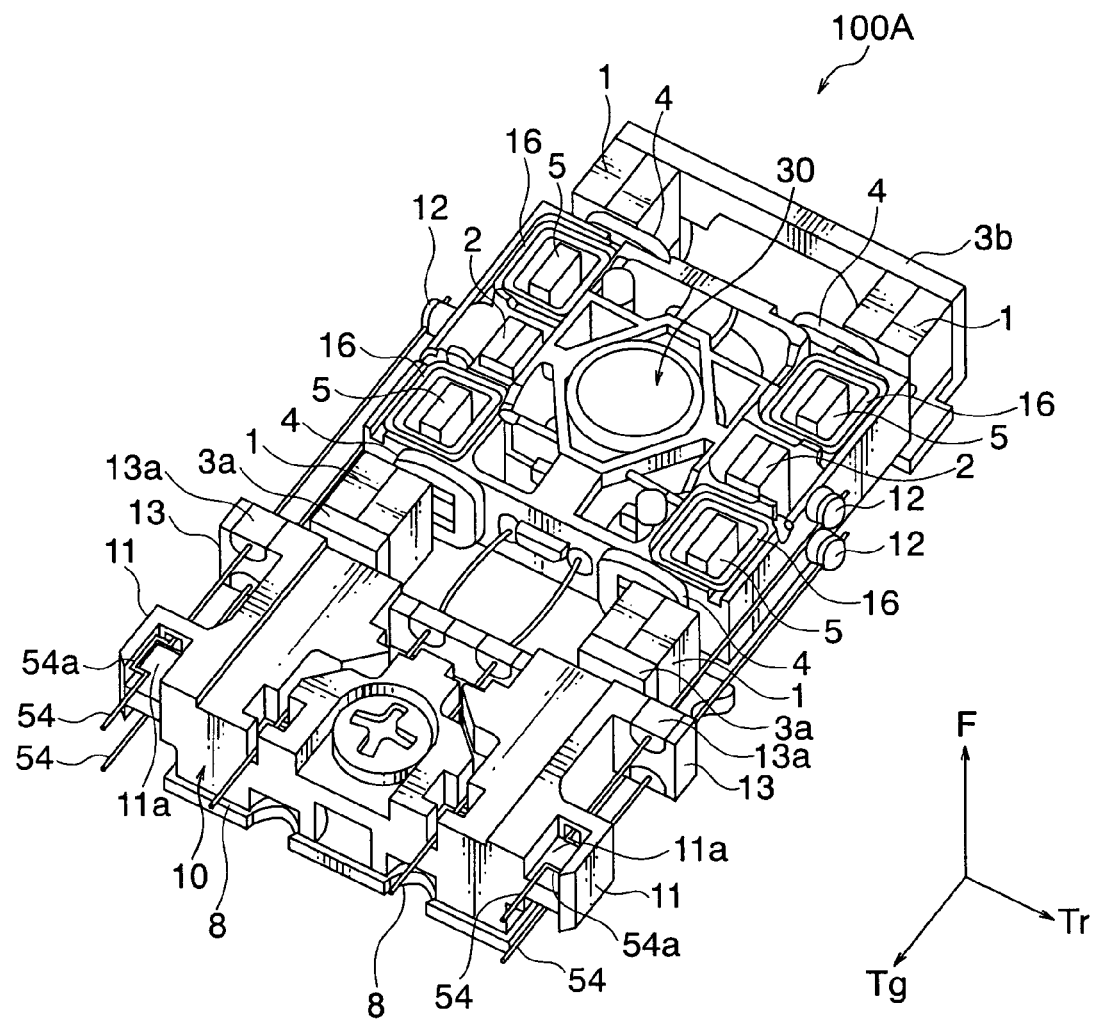
FIG. 9 is a perspective view of an objective lens driving device according to a second embodiment of this invention.
Figure 10:
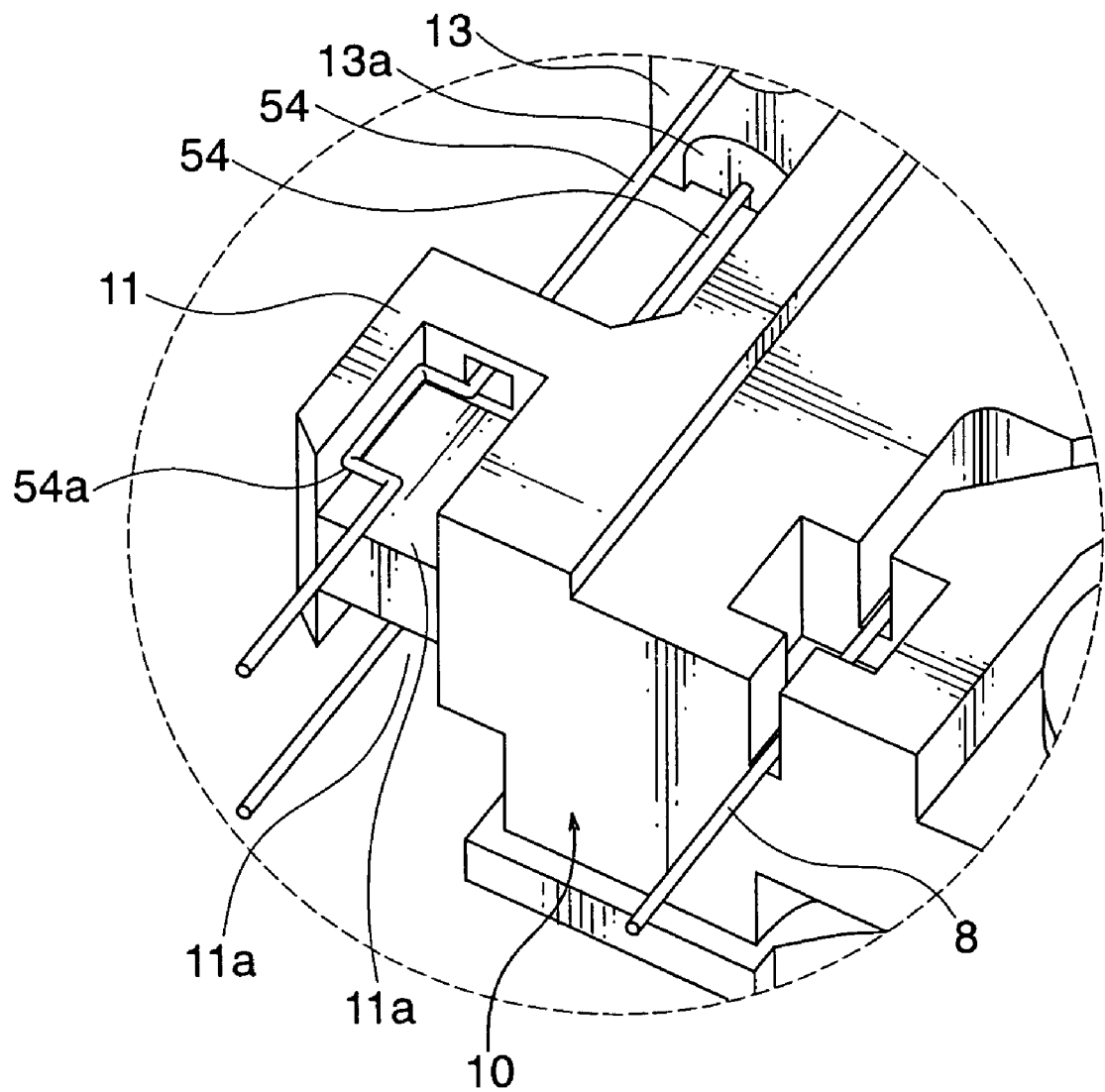
FIG. 10 is an enlarged fragmentary view of a first supporting portion shown in FIG. 9.

Referring to FIGS. 9 and 10, the description will proceed to an objective lens driving device 100A according to a second embodiment of the present invention. FIG. 9 is a perspective view of the objective lens driving device 100A. FIG. 10 is an enlarged fragmentary view of a first supporting portion shown in FIG. 9. The objective lens driving device 100A is similar in structure to the objective lens driving device 100 illustrated in FIG. 1 except that the suspension wires 54 are modified from those illustrated in FIG. 1 as will later become clear.

Each of the first supporting portions 11 has concave portions 11a on opposing ends in the focusing direction F. The concave portions 11a are filled with the adhesive agents through with respective suspension wires 54 are inserted. The one end of each of the suspension wires 54 has a bent portion 54a positioned in a corresponding one of the concave portions 11a.

The one end of each of the suspension wires 54 is soldered to a flexible printed circuit or FPC (not shown). On soldering, heat is transmitted to the adhesive agents in the concave portions 11a through the suspension wires 54 to soften the adhesive agents. If each of the suspension wires 54 has a straight shape as shown in FIG. 1, position displacement may occur in the lens holder 20. In order to prevent such position displacement, according to the objective lens driving device 100A, the one end of each of the suspension wires 54 has the bent portion 54a. Inasmuch as the bent portion 54a is positioned in the corresponding one of the concave portions 11a, it is possible to prevent the lens holder 20 from displacing due to increase of a touch area between the suspension wire 54 and the adhesive agent even if the adhesive agent is softened on soldering.

While this invention has thus far been described in conjunction with the preferred embodiment thereof, it will now be readily possible for those skilled in the art to put this invention into various other manners without departing from the scope of this invention. For example, this invention may be applicable to all of the objective lens driving devices of asymmetry type as well as symmetry type.

What is claimed is:

1. An objective lens driving device which is movable along a tracking direction comprising:
   a lens holder movably holding an objective lens;
   a damper base consisting of one member; and
   a suspension member elastically supporting said lens holder with respect to said damper base, said suspension member comprising a plurality of suspension wires disposed on both sides of said damper base and said lens holder;
   wherein said damper base includes first supporting portions for supporting first ends of said suspension wires via adhesive agents, respectively, and said lens holder includes second supporting portions for supporting second ends of said suspension wires, respectively;
   wherein said damper base includes damper portions disposed between said first supporting portions and said second supporting portions, and each of said damper portions has a groove filled with damper material through which a corresponding one of the suspension wires is inserted;
   wherein the first supporting portions are provided at both lateral sides of the damper base, and the second supporting portions are provided at both lateral sides of the lens holder;
   wherein said lateral sides of the damper base extend along a tangential direction that is perpendicular to the tracking direction, and said lateral sides of the lens holder also extend along the tangential direction that is perpendicular to the tracking direction;
   wherein the second supporting portions are spaced apart from the first supporting portions by a first distance along the tangential direction, and the damper portions are spaced apart from the first supporting portions toward the second supporting portions by a second distance along the tangential direction such that an empty space is provided between the damper portions and the first supporting portions; and
   wherein said second distance is in a range between one-fifth and two-fifths of said first distance.

2. The objective lens driving device as claimed in claim 1, wherein said damper material comprises silicon gel.

3. The objective lens driving device as claimed in claim 1, wherein said second distance is equal to one-third of said first distance.

4. The objective lens driving device as claimed in claim 1, wherein said objective lens driving device is a symmetry type objective lens driving device.

5. The objective lens driving device as claimed in claim 4, further comprising:
   coil devices disposed around said objective lens and held by said lens holder;
   main magnets disposed around said objective lens to apply driving forces to said coil devices in accordance with energizing of said coil devices; and
   auxiliary magnets each disposed between adjacent ones of said coil devices to apply forces to said coil devices in accordance with the energizing of said coil devices to supplement said driving forces.

6. The objective lens driving device as claimed in claim 5, wherein said main magnets and said auxiliary magnets are substantially separated, in terms of vibration, from said lens holder.

7. The objective lens driving device as claimed in claim 5, wherein said objective lens has an optical axis extending in a first direction, and said coil devices are disposed symmetrically at both sides of a plane which includes said optical axis and extends in the tangential direction, which is perpendicular to said first direction.

8. The objective lens driving device as claimed in claim 7, wherein said auxiliary magnets are disposed between adjacent ones of said coil devices that are adjacent to each other along said tangential direction.

9. The objective lens driving device as claimed in claim 8, wherein each of said main magnets is disposed at an outer side, in said tangential direction, of a corresponding one of said adjacent ones of said coil devices.

10. The objective lens driving device as claimed in claim 9, wherein said main magnets are disposed symmetrically at the both sides of said plane, each main magnet at a first one of said sides of said plane has a first polarity in said tangential direction, and each main magnet at a second one of said sides of said plane has a second polarity opposite to said first polarity.

11. The objective lens driving device as claimed in claim 10, wherein said auxiliary magnets are disposed symmetrically at said both sides of said plane, a first one of said auxiliary magnets at the first side of said plane has said second polarity, and a second one of said auxiliary magnets at the second side of said plane has said first polarity.

12. The objective lens driving device as claimed in claim 7, wherein said main magnets and said auxiliary magnets are arranged so as to generate magnetic fields in directions that cancel each other; and
   wherein ones of said main magnets that confront each other along the tracking direction, which is perpendicular to said first and said tangential directions, are arranged so as to have mutually opposite polarities and ones of said auxiliary magnets confronting each other along the tracking direction are arranged so as to have mutually opposite polarities.

13. The objective lens driving device as claimed in claim 5, further comprising a yoke base fixed to said damper base to magnetically couple said main magnets and said auxiliary magnets to said coil devices.

14. The objective lens driving device as claimed in claim 13, wherein said main magnets and said auxiliary magnets are fixed to said yoke base.

15. The objective lens driving device as claimed in claim 13, wherein said yoke base comprises a plurality of yokes, and each of said coil devices comprises a coil member receiving a corresponding one of said yokes fitted therein.

16. The objective lens driving device as claimed in claim 15, wherein each of said coil members comprises a tilting coil and a focusing coil, and each of said coil devices further comprises a tracking coil.

17. The objective lens driving device as claimed in claim 16, further comprising lead wires extending between said damper base and said lens holder, wherein said suspension member consists of four suspension wires, one pair of said four suspension wires are electrically connected to said focusing coil, another pair of said four suspension wires are electrically connected to said tracking coil, and said lead wires are electrically connected to said tilting coil.

18. The objective lens driving device as claimed in claim 1, wherein each of said first supporting portions includes a concave portion filled with an adhesive agent through which a corresponding one of the suspension wires is inserted, and said first end of each of said suspension wires comprises a bent portion positioned in a corresponding one of said concave portions.

* * * * *